March 26, 1935.  R. C. MANSON  1,995,857
BUTTON
Filed May 14, 1934
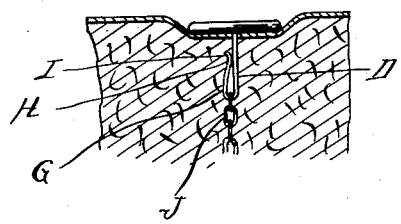
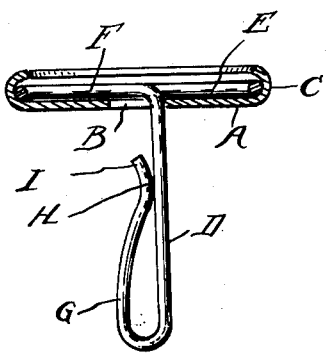
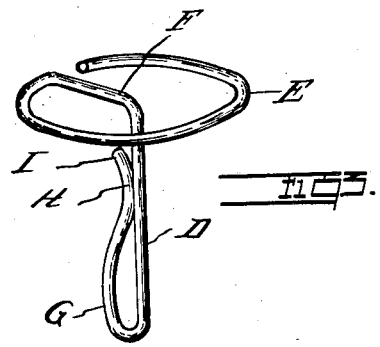
INVENTOR
Roy C. Manson
BY
ATTORNEYS Patented Mar. 26, 1935

1,995,857

UNITED STATES PATENT OFFICE 1,995,857

BUTTON

Roy C. Manson, Detroit, Mich.

Application May 14, 1934, Serial No. 725,640

3 Claims. (Cl. 24—106)

The invention relates to buttons and more particularly that type designed for use with upholstery. It is the object of the invention to obtain a construction which can be easily and cheaply manufactured and which facilitates attachment to the tie cord or chain. To this end the invention consists in the construction as hereinafter set forth.

In the drawing;

Fig. 1 is a sectional elevation showing my improved button as applied to upholstery;

Fig. 2 is an enlarged central cross section thereof;

Fig. 3 is a perspective view of the integral reinforcing bead and snap hook.

In the present state of the art buttons are usually formed of a backing plate or shell to which the ornamental front is secured, and an eye member which is attached to and projects rearward from said shell. In certain constructions this eye member is formed integral with a wire ring fitting around the inner peripheral portion of the shell and forming a reinforcing bead therefor. When used by upholsterers it is necessary to attach the eye of the button to a tie member passing through the upholstery and this tie member is frequently formed of a chain. It is, however, necessary to engage the end of the chain to the eye which, if the latter is completely closed, can not be accomplished without the use of a third member. On the other hand, if the eye is left open, then there is the danger of accidental disengagement. With my improved construction in place of the usual eye, the button is formed with a rearwardly extending central shank provided with a return bent portion which is resiliently pressed against a shank to form a snap hook. This permits of readily engaging the link of the chain with the hook which will then retain said link from disengagement.

In detail, A is the button back preferably formed of sheet metal having the central opening B and the rounded peripheral flange C. D is the shank which is formed integral with a split ring E adapted to be sprung within the flange C of the back to form a reinforcing bead therefor. One end of this ring has the radially inwardly extending portion F which is then bent rearward to form the shank D and the latter is provided with a return bent portion G having a portion H pressed against the shank D and terminating in an outwardly turned portion I for facilitating engagement with the link of the chain. This member is formed of wire of sufficient hardness to retain its shape and to have the desired degree of resiliency. Thus in use, the link of a chain such as J can be engaged with the portion I and then drawn past the portion H into the eye G.

The construction is exceedingly simple, comprising only the two parts, viz: the metal back or shell and the formed wire member, which latter includes the reinforcing ring, the rearwardly extending shank and the return bent snap hook. It also facilitates the work of the upholsterer as the snap hook can be engaged with any link of the chain, thereby forming the means for adjusting the length of said chain.

What I claim as my invention is:

1. In a button, a centrally apertured backing shell having a return bend peripheral flange on its inner side forming an annular groove and a wire member fashioned to form a split ring for reinforcing the inner periphery of said shell, and having integral therewith a rearwardly extending shank passing through said aperture substantially perpendicular to said shell with a return bent portion forming a snap hook.

2. In a button, a centrally apertured backing shell and a wire member having a split ring portion engaging the inner periphery of said shell and forming a reinforcement therefor, a radially extending portion from one end of said split ring bent to extend rearward through the aperture in said shell substantially perpendicular to the plane thereof and return bent to form a normally closed snap hook.

3. In a button, a centrally apertured backing shell, and a resilient wire member fashioned to form a split ring for engaging and reinforcing the inner periphery of said shell, a radially inwardly extending portion, a rearwardly extending portion passing through the aperture in said shell, a return bent portion pressed into contact with said rearwardly extending portion and an outwardly turned portion, said portions together forming a snap hook.

ROY C. MANSON.